(12) United States Patent
Potereau

(10) Patent No.: US 7,742,749 B2
(45) Date of Patent: Jun. 22, 2010

(54) METHOD AND DEVICE FOR PROCESSING SIGNALS RECEIVED BY A RECEIVER OF RADIOPHONIC SIGNALS AND CAR RADIO COMPRISING SUCH A DEVICE

(75) Inventor: Cyrille Potereau, Saint-Arnoult en Yvelines (FR)

(73) Assignee: Continental Automotive France, Toulouse (FR)

( * ) Notice: Subject to any disclaimer, the term of this patent is extended or adjusted under 35 U.S.C. 154(b) by 504 days.

(21) Appl. No.: 11/883,930

(22) PCT Filed: Mar. 14, 2006

(86) PCT No.: PCT/EP2006/002321

§ 371 (c)(1),
(2), (4) Date: Aug. 8, 2007

(87) PCT Pub. No.: WO2006/125486

PCT Pub. Date: Nov. 30, 2006

(65) Prior Publication Data

US 2008/0166987 A1 Jul. 10, 2008

(30) Foreign Application Priority Data

May 25, 2005 (FR) .................................. 05 05241

(51) Int. Cl.
*H04B 1/06* (2006.01)

(52) U.S. Cl. .................. 455/226.1; 455/232.1; 455/345
(58) Field of Classification Search ................. 455/130, 455/219, 220, 221, 226.1, 232.1, 234.1, 254, 455/266, 345
See application file for complete search history.

(56) References Cited

U.S. PATENT DOCUMENTS

| | | | |
|---|---|---|---|
| 5,379,449 A | 1/1995 | Porambo | |
| 5,771,293 A | 6/1998 | Schneider | |
| 6,456,833 B1* | 9/2002 | Sessink | ...................... 455/212 |
| 7,343,143 B2* | 3/2008 | Gamou | ................... 455/226.1 |
| 2003/0100279 A1* | 5/2003 | Medvid et al. | ........... 455/226.2 |

FOREIGN PATENT DOCUMENTS

EP   1 006 666 A1   6/2000

\* cited by examiner

*Primary Examiner*—Thanh C Le
(74) *Attorney, Agent, or Firm*—Young & Thompson

(57) ABSTRACT

A method for processing signals received (30) by a sound program signal receiver includes a step (42, 44) of adjusting at least one parameter for processing small audio signals obtained from the received signals. It further includes a prior step of dividing a space representing a quality of reception of sound program signals into a plurality of reception zones wherein the sound program signal receiver is likely to be located. The adjustment (42, 44) of the parameter for processing small audio signals is determined on the basis of one of the reception zones wherein the sound program signal receiver is located.

15 Claims, 2 Drawing Sheets

Figure 1:
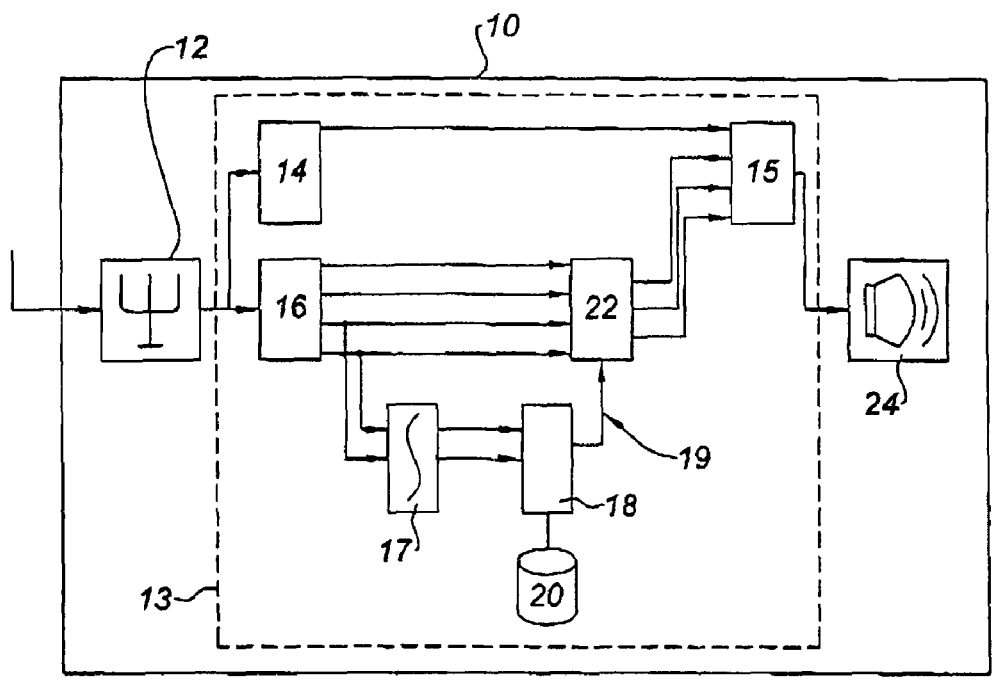

METHOD AND DEVICE FOR PROCESSING SIGNALS RECEIVED BY A RECEIVER OF RADIOPHONIC SIGNALS AND CAR RADIO COMPRISING SUCH A DEVICE

The present invention relates to a method and a device for processing signals received by a receiver of radiophonic signals. It also relates to a car radio comprising such a device.

The expression "received signals" is understood to mean RF (Radio Frequency) signals intended to be received by such receivers. These signals will therefore also be designated subsequently in the description by the expressions "radiophonic signals" or "RF signals".

These RF signals have to be distinguished from audio signals restored by such receivers in a conventional manner on the basis of information contained in the RF signals. These audio signals will be designated subsequently in the description by the expressions "small signals" or "small audio signals".

More precisely, the invention relates to a method for processing signals received by a receiver of radiophonic signals comprising a step of adjusting at least one processing parameter of small audio signals obtained on the basis of the received signals.

Such a device for processing signals received by a receiver of radiophonic signals is for example described in European patent application EP 1 006 666. When it is implemented in a car radio, a processing device of this type makes it possible to adjust parameters such as a sound level, a mono/stereo mode switchover or a bandwidth of the small audio signals. These processing parameters are adjusted as a function of conditions of reception of the RF signals so as to improve the quality of perception of the sounds restored by the car radio. Thus, to determine the adjustment of the processing parameters, a reception parameter, such as a power of the received RF signals, is measured, then the measured value of this reception parameter is used to adjust the value of the processing parameters.

Since the quality of the sounds reproduced by the car radio is directly related to the adjustment of the processing parameters, the method used to adjust the value of the processing parameters as a function of the measured value of the reception parameter is of paramount significance. Thus, in order that the sound rendition be the best possible in all situations, in particular, whatever the location at which the car radio is situated (city zone, plain zone, mountainous zone, etc.), this method results from a compromise making it possible to offer the best possible sound quality in all situations.

Making this compromise necessarily limits the performance of the processing device.

The invention is aimed at solving this problem by providing a device for processing received signals, for which we are not confronted with such a compromise.

The invention is therefore aimed at a method for processing signals received by a receiver of radiophonic signals comprising a step of adjusting at least one processing parameter of small audio signals obtained on the basis of the received signals, characterized in that it furthermore comprises a prior step of partitioning a space for representing a quality of reception of the radiophonic signals into a plurality of reception zones in which the receiver of radiophonic signals is liable to be situated, and in that the adjustment of the processing parameter of the small audio signals is determined as a function of one of the reception zones in which the receiver of radiophonic signals is situated.

Thus, a method for processing signals according to the invention allows optimal adjustment of the processing parameters of the small signals restored, as a function of the reception zone in which the receiver of radiophonic signals is situated.

Preferably, a method for processing signals according to the invention comprises:
  a step of measuring at least one reception parameter of the radiophonic signals, and
  a step of determining the reception zone in which the receiver of radiophonic signals is situated, from among the reception zones in which the receiver of radiophonic signals is liable to be situated, as a function of at least one measured reception parameter, the representation space being defined with the aid of this measured reception parameter.

Certain reception parameters are particularly relevant for defining this representation space for representing a quality of reception of the received radiophonic signals.

In an optional manner, the step of determining a reception zone comprises an estimation of an average value, in a predetermined time window, of each reception parameter measured as a function of which the reception zone in which the receiver of radiophonic signals is situated is determined, and a selection of a reception zone corresponding to the set of estimated average values.

This estimation of an average value makes it possible to add a certain inertia to the processing method, thereby making it possible to avoid detecting unscheduled changes of zones.

In an optional manner also, a method for processing signals according to the invention can comprise a step of measuring at least one reception parameter of the radiophonic signals, and the adjustment of the processing parameter of the small audio signals can also be determined as a function of the measured reception parameter.

Thus, applied to the method described in application EP 1 006 666, a method according to the invention would make it possible to envisage several methods of adjusting the value of the processing parameters as a function of the measured value of the reception parameter, according to the reception zones in which the receiver of radiophonic signals is liable to be situated, this not being envisaged in EP 1 006 666.

A method for processing signals according to the invention can furthermore comprise the following steps:
  storage of a plurality of sets of predetermined coefficients, each set being associated with a reception zone from among the plurality of zones in which the receiver of radiophonic signals is liable to be situated,
  selection of a set of predetermined coefficients, associated with the zone in which the receiver of radiophonic signals is situated, and
  transmission of the selected set of predetermined coefficients for the adjustment of the processing parameter.

In an optional manner, the adjustment of the processing parameter of the small audio signals is determined as a function of a combination of the measured reception parameter and of the selected set of coefficients.

In this case, since it is the values of the predetermined coefficients which change from one set to another, while the combination of the reception parameter or parameters measured with these predetermined coefficients may remain unchanged, this makes it possible to continue to use existing microprocessors, in which this combination is preprogrammed.

For example, the combination of the measured reception parameter and of the selected set of coefficients determining the adjustment of the processing parameter is defined by a system of at least one equation.

Each set of predetermined coefficients can comprise at least one processing time constant of the small signals, in particular an attack time constant and/or a relaxation time constant.

Thus, the processing time constants of small signals are likewise dependent on the zone in which the receiver of radiophonic signals is situated.

According to a preferred embodiment of the invention, the adjustment of the processing parameter comprises:
- an estimation of as many values of this processing parameter as measured reception parameters, each estimated value of this processing parameter being dependent on a measured reception parameter and on a part of the coefficients of the selected set of coefficients and,
- a determination of a final value of the processing parameter as a function of a plurality of estimated values of this processing parameter.

In particular, the determination of a final value of the processing parameter can consist in determining a minimum value from among the plurality of estimated values of this processing parameter.

This determination of a final value of the processing parameter in two stages makes it possible to use a simple system of equations to effect the combination of the measured reception parameter and of the selected set of predetermined coefficients.

Preferably, the processing parameter or parameters is or are chosen from among one of the elements of the set consisting of a sound level, of a mono/stereo mode switchover and of a bandwidth of the small audio signals.

Preferably also, the processing parameter or parameters is or are chosen from among at least one of the elements of the set consisting of a power, of a parameter indicating multiple paths, of a parameter indicating an adjacent emitter and of a modulation of the received signals.

Finally, preferably also, the processing parameter or parameters as a function of which the zone in which the receiver of radiophonic signals is situated is determined, is or are chosen from among at least one of the elements of the set consisting of a power and of a parameter indicating multiple paths of the received signals.

Specifically, it is especially the power of the received signals and their paths, possibly multiple, which best characterize the zone in which the receiver of radiophonic signals is situated and thus make it possible to define in a relevant manner the space for representing a quality of reception of the radiophonic signals.

The invention also relates to a device for processing signals received by a receiver of radiophonic signals, for the implementation of a processing method according to the invention, characterized in that it comprises:
- means of storing a space for representing a quality of reception of the radiophonic signals, partitioned into a plurality of reception zones in which the receiver of radiophonic signals is liable to be situated, and
- means of adjusting at least one processing parameter of the small signals obtained on the basis of the received signals, as a function of the one of the reception zones in which the receiver of radiophonic signals is situated.

Finally the invention also relates to a car radio comprising a device for processing signals, such as defined previously.

Figure 3:
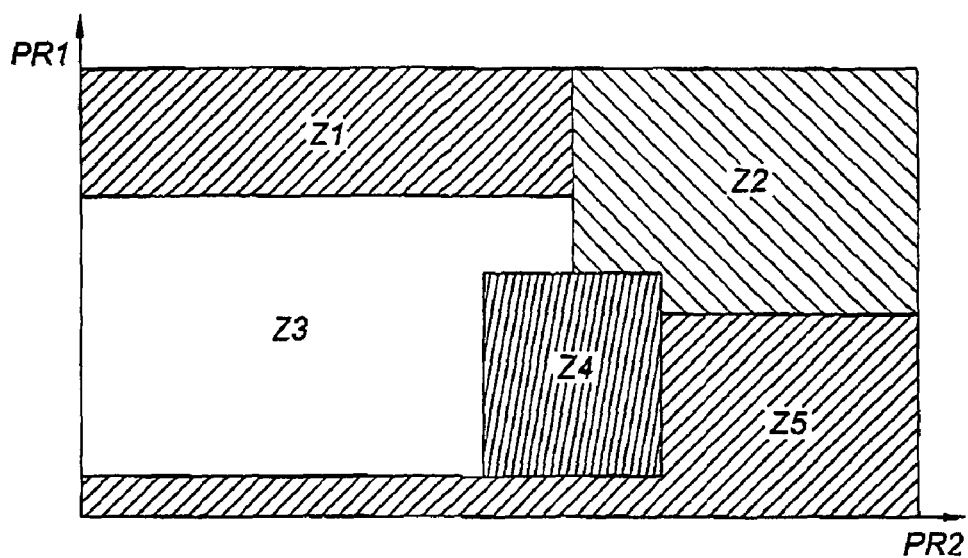
Figure 2:
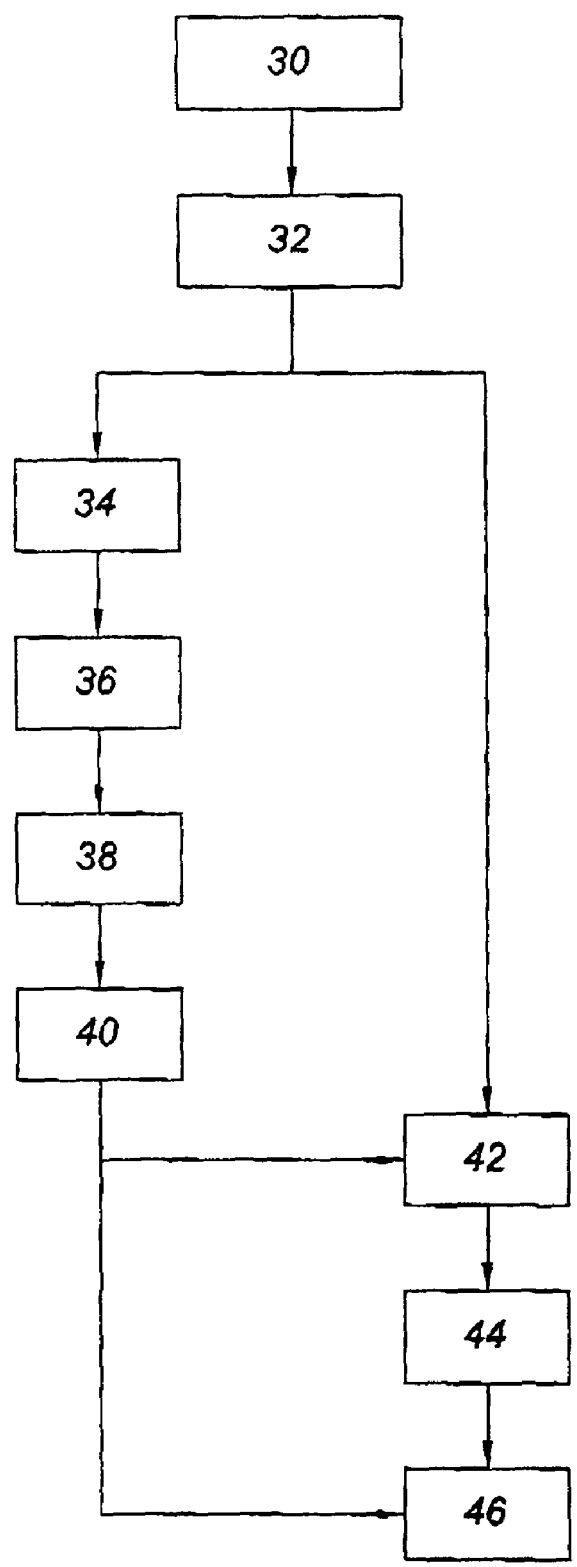

The invention will be better understood with the aid of the description which follows, given solely by way of example and while referring to the appended drawings in which:

FIG. 1 diagrammatically represents the general structure of a processing device according to the invention;

FIG. 2 represents the successive steps of a processing method according to the invention; and FIG. 3 represents a diagram making it possible to determine a zone in which a receiver of radiophonic signals is situated.

The receiver of radiophonic signals 10 represented in FIG. 1 comprises an antenna 12 for the reception of radiophonic signals and a device 13 for processing the signals received by this antenna 12.

The processing device 13 comprises in a conventional manner restitution means 14 for restoring small audio signals on the basis of the radiophonic signals received by the antenna 12 and a low-frequency amplifier 15 applied to the small signals provided by the restitution means 14 to modify their restitution. The low-frequency amplifier processes the small signals with the aid of processing parameters that it receives as input.

The processing device 13 furthermore comprises means 16 of measurement of at least one reception parameter. The reception parameters are for example a power, a parameter indicating multiple paths, a parameter indicating an adjacent emitter, and a modulation of the received signals. These parameters are estimated in a manner known per se on the basis of an analysis of the radiophonic signals received by the antenna 12.

From among the reception parameters estimated by the measurement means 16, at least part is transmitted to means 17, 18, 20 of determination of a zone Zi in which the receiver of radiophonic signals 10 is situated, from among a plurality of reception zones in which the receiver of radiophonic signals is liable to be situated.

For example, from among the reception parameters measured by the measurement means 16, the power parameter and parameter indicating multiple paths are transmitted to the determination means 17, 18, 20.

The determination means 17, 18, 20 comprise in an advantageous manner means 17 of estimating an average value, in a predetermined time window, of each reception parameter that they receive. They furthermore comprise means 18 of selecting a zone corresponding to the set of average values estimated by the means 17.

The selection means 18 are associated with storage means 20 (a memory of conventional type), in which is stored a plurality of sets of predetermined coefficients. Each set of coefficients is associated with a reception zone from among the plurality of zones in which the receiver of signals 10 is liable to be situated.

The coefficients of any one of the stored sets are intended to be combined with the reception parameters estimated by the measurement means 16 to adjust the processing parameters of the small audio signals restored by the means 14 of the processing device 13. They comprise in particular an attack time constant and/or a relaxation time constant of the processings carried out on the small signals.

The attack time constant corresponds to a timeout for applying the processings determined by the processing parameters to the small signals. The relaxation time constant corresponds to a timeout of the removal of the processings determined by the processing parameters applied to the small signals.

The selection means 18 operate in the following manner:
- as a function of the reception parameter average values provided by the estimation means 17, they determine a zone in which the receiver of radiophonic signals is situated, from among the set of reception zones in which the receiver of radiophonic signals is liable to be situated, each reception zone being associated with a defined set of average values of these reception parameters; and they thereafter select the set of coefficients stored in the storage means 20 which corresponds to the selected zone.

An exemplary way of associating each reception zone with a set of average parameter values provided by the estimation means 17 will be detailed with reference to FIG. 3.

The processing device 13 furthermore comprises means 19 of transmitting the set, selected by the selection means 18, of predetermined coefficients to means 22 of adjustment of at least one processing parameter of the small audio signals as a function of a combination of the measured reception parameters and of the selected set of predetermined coefficients.

The processing parameters of the small signals comprise for example:

the sound level of the small audio signals restored by the receiver of radiophonic signals 10;

a parameter of mono/stereo mode switchover; and a parameter making it possible to define a bandwidth of the small audio signals.

The adjustment means 22 therefore receive as input the reception parameters estimated by the measurement means 17, as well as the set, selected by the means 18, of predetermined coefficients.

As output they provide the adjusted processing parameters to the low-frequency amplifier 15 for the processing of the small signals.

For each processing parameter whose level has to be adjusted, the adjustment means 22 operate, for example, in the following manner:

they estimate as many values of this processing parameter as measured reception parameters, each estimated value of this processing parameter being dependent on a measured reception parameter and on part of the coefficients of the set of selected coefficients, and they determine a final value of the processing parameter as a function of the plurality of estimated values of this processing parameter (for example, the final value of the processing parameter is determined so as to correspond to the smallest of the estimated values of this processing parameter).

For example, if we denote by:

NS the sound level, MS the parameter of mono/stereo mode switchover, BP the bandwidth, as regards the processing parameters of the small signals, PR1 the power, PR2 the parameter indicating multiple paths, PR3 the parameter indicating an adjacent emitter and PR4 the modulation of the received signals, as regards the measured reception parameters, and $\{a_i, \ldots, z_i, ta_i, tr_i\}$ the set of coefficients corresponding to the selected zone Zi, it is possible to estimate several values of each processing parameter, with the aid of the following system of equations:

$$NS_1 = a_i \times PR1 + b_i$$

$$NS_2 = c_i \times PR2 + d_i$$

$$NS_3 = e_i \times PR3 + f_i$$

$$NS_4 = g_i \times PR4 + h_i$$

$$MS_1 = j_i \times PR1 + k_i$$

$$MS_2 = l_i \times PR2 + m_i$$

$$MS_3 = n_i \times PR3 + p_i$$

$$MS_4 = q_i \times PR4 + r_i$$

$$BP_1 = s_i \times PR1 + t_i$$

$$BP_2 = u_i \times PR2 + v_i$$

$$BP_3 = w_i \times PR3 + x_i$$

$$BP_4 = y_i \times PR4 + z_i \quad (1)$$

Thereafter, the final values of the processing parameters NS, MS and BP can be calculated with the aid of the following system of equations:

$$NS = \mathrm{MIN}(NS_1, NS_2, NS_3, NS_4),$$

$$MS = \mathrm{MIN}(MS_1, MS_2, MS_3, MS_4),$$

$$BP = \mathrm{MIN}(BP_1, BP_2, BP_3, BP_4), \quad (2)$$

where MIN is the "Minimum" function.

These parameters NS, MS and BP, associated with the attack time $ta_i$ and with the relaxation time $tr_i$, also provided with the set of predetermined coefficients selected by the means 18, make it possible to define the way in which the small signals must be processed, by the low-frequency amplifier 15, before being provided to a loudspeaker 24 of the receiver 10.

It will be noted that the means 14, 16, 17, 18, 19 and 22 have been described above in a functional manner. On the basis of this functional description, they can readily be implemented in a software manner or programmed in at least one conventional microprocessor, in the processing device 13.

The processing device 13 described above operates, for example, according to the method described below with reference to FIG. 2.

During a first step 30, the processing device 13 receives radiophonic signals originating from the antenna 12.

During the following step 32, the measurement means 16 estimate instantaneous values of the reception parameters PR1, PR2, PR3 and PR4. These instantaneous values are transmitted by the measurement means 16 to the adjustment means 22.

Thereafter, during a step 34, part of these parameters is tapped off so as to be provided to the means 17 of estimating an average value. This involves the parameters PR1 (power) and PR2 (parameter indicating multiple paths).

During the following step 36, average values of these two parameters tapped off are calculated by the means 17, over a predetermined time window.

Thereafter, during a step 38, a zone in which the receiver 10 is situated is determined, as a function of the average values calculated by the means 17. The selection is carried out with the aid of a diagram which will be described subsequently, with reference to FIG. 3.

During this same step, the set of predetermined coefficients that is associated with the selected zone is selected.

Thereafter, during a step 40, the set of predetermined coefficients that was selected by the means 18 is transmitted to the adjustment means 22.

Then, during a step 42, during which the results of steps 32 (instantaneous values of the reception parameters) and 40 (selected set of predetermined coefficients) are used, the adjustment means 22 calculate a plurality of estimated values of the processing parameters, with the aid of the system of equations (1).

During the following step 44, the adjustment means 22 calculate the final values of the processing parameters, with the aid of the system of equations (2).

Lastly, during a final step 46, the low-frequency amplifier 15 processes the small signals restored by the means 14, as a function of the processing parameters estimated by the adjustment means 22 and of the attack times and relaxation time also provided in the selected set of predetermined coefficients.

As is represented in FIG. 3, it is possible to define a space for representing a quality of reception of the radiophonic signals by a diagram in which the abscissa axis represents the values that can be taken by the parameter PR2 indicating multiple paths, and the ordinate axis represents the values that can be taken by the parameter PR1 of power of the received signals.

A prior step of partitioning this representation space, into a plurality of reception zones in which the receiver of radiophonic signals is liable to be situated, is carried out. The partitioned representation space is thereafter stored, for example, in the memory 20.

In the example of FIG. 3, five reception zones Z1, Z2, Z3, Z4 and Z5 are distinguished.

Zone Z1 corresponds to high values of the power and to low or average values of the parameter indicating multiple paths, which thus indicates that zone Z1 is a zone of very good reception. This zone is associated with the set of predetermined coefficients $\{a_1, \ldots, z_1, ta_1, tr_1\}$.

Zone Z2 corresponds to average or high values of the power and to high values of the parameter indicating multiple paths, thereby in general corresponding to a city zone. This zone is associated with the set of predetermined coefficients $\{a_2, \ldots, z_2, ta_2, tr_2\}$.

Zone Z3 corresponds to low or average values of the power and to low or average values of the parameter indicating multiple paths, thereby generally corresponding to a plain zone in the countryside. This zone is associated with the set of predetermined coefficients $\{a_3, \ldots, z_3, ta_3, tr_3\}$.

Zone Z4 corresponds to low or average values of the power and to average or indeed high values of the parameter indicating multiple paths, thereby in general corresponding to a valley zone in the countryside. This zone is associated with the set of predetermined coefficients $\{a_4, \ldots, z_4, ta_4, tr_4\}$.

Finally, zone Z5 corresponds:

to very low values of the power and low or average values of the parameter indicating multiple paths, or to low or average values of the power and to high values of the parameter indicating multiple paths, which thus indicates that zone Z5 is a zone of very bad reception of the small signals. This zone is associated with the set of predetermined coefficients $\{a_5, \ldots, z_5, ta_5, tr_5\}$.

The relaxation times (and also the attack times) are chosen, for each zone, as a function of a certain number of rules. For example, in a zone such as zone Z1 or Z3, the relaxation time must be low. In a zone such as zone Z2, Z4 or Z5, the relaxation time must be high.

It will be noted that the invention is not limited to the example described above.

Thus, as a variant, although in the example described above the selection of the zone depends directly on average values of the power parameter PR1 and the parameter indicating multiple paths PR2, additional conditions can be added in order that the selection of the zone depend also on the other reception parameters measured by the measurement means 16, such as the parameter indicating an adjacent emitter PR3 or the modulation of the received signals PR4. For example, it is possible to take account of these last two parameters to modify the position of a point found in the diagram of FIG. 3 on the basis of the parameters PR1 and PR2.

As a variant also, the system of equations (1) can be modified and the function making it possible to determine a final value of the processing parameters on the basis of several estimated values of these processing parameters can be chosen other than the "Minimum" function.

It is clearly apparent that a processing method and device according to the invention make it possible to add great flexibility in the processing of the signals received by a receiver of radiophonic signals, such as a car radio, as a function of the zone in which this receiver is situated. No compromise is necessary for determining the values of the coefficients since the latter are dependent on various predefined reception zones.

The invention claimed is:

1. A method for processing signals (30) received by a receiver (10) of radiophonic signals comprising a step (42, 44) of adjusting at least one processing parameter of small audio signals obtained on the basis of the received signals, characterized in that it furthermore comprises a prior step of partitioning a space for representing a quality of reception of the radiophonic signals into a plurality of reception zones (Z1, Z2, Z3, Z4, Z5) in which the receiver of radiophonic signals is liable to be situated, and in that the adjustment (42, 44) of the processing parameter of the small audio signals is determined as a function of one of the reception zones in which the receiver of radiophonic signals is situated.

2. The method for processing signals as claimed in claim 1, comprising:

a step (32) of measuring at least one reception parameter of the radiophonic signals, and a step (36, 38) of determining the reception zone in which the receiver (10) of radiophonic signals is situated, from among the reception zones (Z1, Z2, Z3, Z4, Z5) in which the receiver of radiophonic signals is liable to be situated, as a function of at least one measured reception parameter, the representation space being defined with the aid of this measured reception parameter.

3. The method for processing signals as claimed in claim 2, in which the step (36, 38) of determining a reception zone comprises an estimation (36) of an average value, in a predetermined time window, of each reception parameter measured as a function of which the reception zone in which the receiver of radiophonic signals is situated is determined, and a selection (38) of a reception zone corresponding to the set of estimated average values.

4. The method for processing signals as claimed in claim 2, in which said at least one reception parameter comprises at least one of the elements of the set consisting of a power, a parameter indicating multiple paths, a parameter indicating an adjacent emitter and a modulation of the received signals.

5. The method for processing signals as claimed in claim 2, in which said at least one reception parameter as a function of which the zone in which the receiver of radiophonic signals is situated is determined, comprises at least one of the elements of the set consisting of a power and a parameter indicating multiple paths of the received signals.

6. The method for processing signals as claimed in claim 1, comprising a step (32) of measuring at least one reception parameter of the radiophonic signals, and in which the adjustment of the processing parameter of the small audio signals is also determined as a function of the measured reception parameter.

7. The method for processing signals as claimed in claim 1, furthermore comprising the following steps:

storage of a plurality of sets of predetermined coefficients, each set being associated with a reception zone from among the plurality of zones in which the receiver (10) of radiophonic signals is liable to be situated, selection (38) of a set of predetermined coefficients associated with the zone in which the receiver of radiophonic signals is situated, and transmission (40) of the selected set of predetermined coefficients for the adjustment of the processing parameter.

8. The method for processing signals as claimed in claim 7, in which the adjustment (42, 44) of the processing parameter of the small audio signals is determined as a function of a combination of the measured reception parameter and of the selected set of coefficients.

9. The method for processing signals as claimed in claim 8, in which the combination of the measured reception parameter and of the selected set of coefficients determining the adjustment of the processing parameter is defined by a system of at least one equation.

10. The method for processing signals as claimed in claim 7, in which each set of predetermined coefficients comprises at least one processing time constant of the small signals, in particular an attack time constant and/or a relaxation time constant.

11. The method for processing signals as claimed in claim 1, in which the adjustment (42, 44) of the processing parameter comprises:

an estimation (42) of as many values of this processing parameter as measured reception parameters, each estimated value of this processing parameter being dependent on a measured reception parameter and on a part of the coefficients of the selected set of coefficients, and a determination (44) of a final value of the processing parameter as a function of a plurality of estimated values of this processing parameter.

12. The method for processing signals as claimed in claim 11, in which the determination (44) of a final value of the processing parameter consists in determining a minimum value from among the plurality of estimated values of this processing parameter.

13. The method for processing signals as claimed in claim 1, in which said at least one processing parameter comprises at least one of the elements of the set consisting of a sound level, a mono/stereo mode switchover and a bandwidth of the small audio signals.

14. A device for processing signals received by a receiver (10) of radiophonic signals, for the implementation of a processing method according to claim 1, characterized in that it comprises:

means (20) of storing a space for representing a quality of reception of the radiophonic signals, partitioned into a plurality of reception zones ($Z1$, $Z2$, $Z3$, $Z4$, $Z5$) in which the receiver of radiophonic signals is liable to be situated, and means (22) of adjusting at least one processing parameter of the small signals obtained on the basis of the received signals, as a function of one of the reception zones in which the receiver of radiophonic signals is situated.

15. A car radio comprising a device for processing small signals as claimed in claim 14.

* * * * *